United States Patent [19]
Bhagat et al.

[11] Patent Number: 5,414,750
[45] Date of Patent: May 9, 1995

[54] AUTOMATED SEAMLESS CELLULAR TELEPHONE NETWORK

[75] Inventors: Jai P. Bhagat, Jackson, Miss.; David W. Ackerman, Washington, D.C.; Ernest A. Oswalt, Raymond; William D. Hays, Jackson, both of Miss.

[73] Assignee: Mobile Telecommunication Technologies, Jackson, Miss.

[21] Appl. No.: 73,527

[22] Filed: Jun. 9, 1993

[51] Int. Cl.6 .................................. H04M 11/00
[52] U.S. Cl. .............................. 379/57; 379/58
[58] Field of Search ............... 379/58, 59, 60, 63; 455/33.1, 33.2, 54.1, 56.1

[56] References Cited

U.S. PATENT DOCUMENTS 5,090,051 2/1992 Muppidi et al. ............... 379/61
5,307,399 4/1994 Dal et al. ....................... 379/57

*Primary Examiner*—Curtis Kuntz
*Assistant Examiner*—Michael B. Chernoff
*Attorney, Agent, or Firm*—Finnegan, Henderson, Farabow, Garrett & Dunner

[57] ABSTRACT

A system for establishing a communication link between a caller and a mobile communication device that includes a mobile telephone and a paging device capable of receiving information transmitted from a paging network. In addition to the mobile communication device, the system includes a telephone network, a first mobile switching center, a conference bridge, a paging network, and a second mobile switching center. The first mobile switching center receives a telephone call transmitted over the telephone network using an identification number of the mobile telephone. If the mobile communication device is not located in the area covered by the mobile switching center, the mobile switching center forwards the received telephone call to a conference bridge using a bridge number assigned to the mobile communication device. The conference bridge receives the forwarded telephone call and transmits an identification number of the paging device in the mobile communication device to the paging network. The paging network receives the paging number and transmits a page to the paging device using the paging number. In response to the page, the mobile communication device calls the conference bridge using a bridge callback number. In response to the callback from the mobile communication device, the conference bridge connects the caller to the mobile telephone in the mobile communication device.

9 Claims, 11 Drawing Sheets

AUTOMATED SEAMLESS CELLULAR TELEPHONE NETWORK

BACKGROUND OF THE INVENTION

1. Field of the Invention

The present invention relates to a system for establishing a communication link between a caller and a mobile communication device. More particularly, the present invention relates to a system for establishing a communication link between a caller and a mobile communication device to permit automatic, transparent roaming by an operator of the mobile communication device.

2. Background Information

Mobile or cellular telephone systems were initially developed principally as local networks. In such a local network, an operator of a cellular telephone subscribes to a cellular carrier system which provides mobile telephone services in a particular geographic region.

In these local networks, the subscriber is provided with a cellular telephone number and/or mobile identification number (MIN). These numbers allow a caller to call the subscriber's mobile telephone when the mobile telephone is physically located within the geographic region serviced by the subscriber's cellular carrier. If the subscriber's mobile telephone is not located within that particular geographic region, at which time the subscriber is referred to as a "roaming subscriber" or "roamer", the carrier cannot provide direct access to the subscriber's mobile telephone. Hence, such local networks are limited in service performance.

Several conventional systems exist for providing mobile telephone services to a roaming subscriber. The simplest system requires a roaming subscriber to inform potential callers of his or her itinerary and give to the potential callers a different access number for each regional carrier system corresponding to each geographic region that the roamer intends to visit. In this system, any potential caller who does not have the appropriate access number cannot place a telephone call to the roaming subscriber. To contact the roaming subscriber in such a system, the caller dials the appropriate access number for the regional carrier system servicing the geographic region in which the caller believes the roamer is located. Typically, this call is a toll call for the caller.

A second conventional system which may allow for some form of roaming is described in U.S. Pat. No. 4,672,655 issued to Koch. In Koch, a caller dials a mobile subscriber's telephone number, which connects the caller to a call center. Then the caller enters the caller's telephone number, and in some cases a code number for the geographic region or the local area in which the mobile subscriber is to be located. The caller then hangs up. The call center formulates a data signal which includes the mobile subscriber's telephone number, the caller's telephone number, and possibly the geographic region code, and sends the signal to a ground radio station which uplinks the signals to a satellite. The satellite transmits the signal to transceivers corresponding to the geographic region in which the roamer is to be located. Each of the transceivers receives the signals and retransmits the received signals over the particular geographic area covered by that transceiver. If the mobile subscriber is located in an area covered by one of the transceivers, the mobile subscriber's telephone will receive the signals and store the telephone number of the caller. The subscriber's mobile telephone responds by transmitting the stored telephone number of the caller to a base radio station associated with a call center in the region in which the subscriber is located. That call center then places the subscriber's call to the caller via the public switched telephone network ("PSTN").

This second conventional system improves the ability of a caller to reach a subscriber's mobile telephone when the subscriber is roaming because it employs a satellite and a plurality of transceivers to cover a larger geographic area than the systems previously described. However, like the first system described above, this second system also requires that the caller be aware of the subscriber's location when calling the subscriber. Moreover, in addition to dialing the subscriber's telephone number, the caller must dial the caller's own telephone number and possibly a code identifying the region in which the subscriber is located. Hence, this system, like the first system, does not allow a caller to access a subscriber's mobile telephone by calling the subscriber's cellular telephone number or MIN, without having any knowledge of the subscriber's geographic whereabouts. In other words, these first two systems lack "transparency."

The Koch system is further disadvantageous because it does not provide for verifying a roaming subscriber's creditworthiness before connecting the subscriber to the caller. As cellular companies are discovering, this can result in hundreds of thousands of dollars of fraudulent cellular services, a cost which is ultimately borne by bona fide subscribers.

Another conventional system improves the transparency of the roaming process by forwarding calls from a subscriber's carrier system to a visited carrier system, an implementation sometimes referred to as "follow-me roaming." In such a system, the roaming subscriber must dial an access code or number, such as, for example, *31, when visiting a geographic region covered by a participating cellular carrier. The visited carrier system performs roamer validity checks or verifies a roamer's creditworthiness through a clearinghouse, which maintains subscriber databases to validate the creditworthiness of roaming subscribers. When the roamer is validated, the visited carrier system assigns a temporary local directory number (TLDN) to the subscriber. The visited carrier system then sends the TLDN to the subscriber's home carrier system. In response to calls for the subscriber placed to the home carrier system, the home carrier system invokes call forwarding using the TLDN. Thus, when a caller dials the subscriber's cellular telephone number or MIN, the call is forwarded by the home carrier system to the visited carrier system.

This "follow-me" service has advantages over the first two systems because, although the subscriber is roaming, a caller need only dial the subscriber's cellular telephone number or MIN. Toll charges from the home system to the visited system, along with airtime charges and any daily fixed roaming fees are charged to the roaming subscriber, not the caller. The "follow-me" service suffers some disadvantages, however, particularly from the perspective of the roaming subscriber who must re-register with each visited carrier and then re-register periodically for the same visited carrier. In some systems, for example, the roamer must re-register within 12 hours of the last mobile-originated call. If the roamer does not re-register, the TLDN is removed from the visited system and the "follow-me" feature is terminated. Conventional systems implementing follow-me services are also disadvantageous because not all geographic regions are covered by participating cellular carriers.

In a hybrid conventional system, carriers allow a roaming subscriber to select either follow-me roaming or a more conventional roaming. In such a hybrid system, the caller must call both the subscriber's home cellular carrier and the cellular carrier covering the geographic region in which the subscriber is roaming. In particular, if the subscriber selects the more conventional form of roaming, he or she dials a different access code in the visited system (for example *32). The visited carrier system then informs the subscriber's home carrier system of the subscriber's presence in the visited geographic region. In response to a call to the subscriber's cellular telephone number, the home carrier system connects the caller to a recorded announcement informing the caller of the roamer access number of the visited carrier system. After listening to the recorded message, the caller must hang up, and, if the caller desires to do so, place a second call by dialing the roamer access number, receiving a second dial tone, and then dialing the roaming subscriber's cellular telephone number or MIN to reach the roaming subscriber's mobile telephone. In this system, the caller pays any toll charges for the connection to the visited system.

This hybrid system has an advantage over the first system discussed above because the visited carrier system automatically notifies the home system of the roaming subscriber's presence in the geographic region covered by the visited carrier system when the roaming subscriber dials the access code. The subscriber thus does not need to inform potential callers of his or her itinerary. However, like the other conventional systems discussed, this hybrid system also lacks transparency, in that the caller must make a second telephone call, which is typically a toll call, to reach the subscriber. Further, as in the follow-me roaming system, the subscriber must notify the visited regional carrier of the subscriber's presence by dialing a code.

In each of the conventional systems described above, the roaming subscriber is required to take some specified action; thus, the systems are not "automatic" to the subscriber. The cellular industry, through activities of the Cellular Telecommunications Industry Association (CTIA) and the Telecommunications Industry Association (TIA), has developed a set of interim standards recommending methods for allowing for what they refer to as "automatic roaming." However, as will be discussed below, these standards do not provide for a truly automatic system for providing service to roaming subscribers, but merely provides for a system in which some portions of the system are automatic.

The interim standards, called IS-41, include automatic mechanisms for identifying the visited carrier system to the subscriber's home carrier system, establishing financial responsibility for the roaming subscriber, establishing a roamer service profile including a list of features, capabilities, and operating restrictions pertaining to the roaming subscriber in the visited system, and providing for call delivery to the roaming subscriber.

A system of automatic roaming using the IS-41 standards relies on two classes of database for determining a subscriber's location. The first class of database is home location registers (HLR's), which contain basic information, such as a MIN, pertaining to each subscriber in a particular carrier system the current location of the subscriber, an electronic serial number of the subscriber's mobile telephone, and permitted services and features. The second class of database is visitor location registers (VLR's), which contain information concerning roamers. Each HLR and each VLR may serve more than one cellular telephone system.

In the operation of a system of roaming using the IS-41 standards, a roamer is required to register in a visited carrier system. The registration may be initiated directly by the roamer, or a mobile telephone switching office (MTSO) of a visited carrier system may detect the roamer's presence from a call initiated by the roamer, a call completed to the roamer, or through a request for service. Once the registration has been initiated, the visited MTSO notifies its associated VLR that the roamer has registered. The VLR then sends a registration notification message to the HLR associated with the roamer's home carrier system. The message sent by the VLR is routed according to the roamer's MIN. If the roamer was previously registered with a different visited carrier system, the HLR sends a registration cancellation message to the VLR associated with the different carrier system.

After the new VLR sends the message to the HLR, the new VLR opens a record for the roamer, and the HLR records the identification of the visited system. The VLR may send a qualification request message to the HLR to verify the roamer's MIN and electronic serial number (ESN). The VLR may also send a service profile request to the HLR to determine the types of service the roamer is entitled to receive. The registration, qualification, and service profile requests may be sent as separate messages or may be transmitted all at once.

When a caller dials the roamer's MIN, the call is first routed to the mobile telephone switching office of the roamer's home carrier system, which interrogates the associated HLR with a location request to determine the current location of the roamer. The HLR responds by sending a routing request message to the VLR associated with the carrier system the roamer is visiting. The VLR passes the request to the mobile telephone switching office center of the visited carrier system to determine whether the roamer's mobile telephone is busy or idle. If the roamer's mobile telephone is idle, the visited MTSO assigns a TLDN to the roamer and returns the TLDN to the VLR. The VLR responds to the routing request by sending the TLDN to the HLR. The HLR then responds to the location request by sending the TLDN to the home MTSO. The home MTSO then forwards the call to the roamer using the TLDN.

This system, according to the IS-41 standards, suffers from the drawback that it is not truly automatic. As in the previously described systems, the roaming subscriber must register in a visited system by entering a code or by making a phone call from the visited region.

SUMMARY OF THE INVENTION

An object of the present invention is to provide a system for establishing a communication link between a caller and a mobile communication device including a telephone which permits transparent roaming by the operator of the mobile communication device.

An additional object of the present invention is to provide a system for establishing a communication link between a caller and a mobile communication device including a telephone in which transparent roaming by an operator of the mobile communication device is automatic.

Another object of the present invention is to provide a mobile communication device capable of transparent automatic roaming.

To achieve the foregoing desires and objects, and in accordance with the purposes of the invention as embodied and broadly described herein, the present invention provides a system for establishing a communication link between a caller and a mobile communication device. The mobile communication device includes a mobile telephone and a paging device capable of receiving information transmitted from a paging network. The system includes a first mobile switching center for receiving a first signal in response to a telephone call from the caller, the first signal including an identification number of the mobile telephone, a conference bridge, a paging network, the mobile communication device, and a second mobile switching center. The first mobile switching center comprises an input port for receiving the first signal, a controller for generating a second signal in response to the first signal, the second signal including a conference bridge number corresponding to the mobile telephone and the identification number of the mobile telephone, and a transmitter for transmitting the second signal. The conference bridge corresponding to the conference bridge number comprises an in-dial port for receiving the second signal, a controller for generating a third signal in response to the second signal, the third signal including a paging network number and an identification number of the paging device, and an out-dial port for transmitting the third signal. The paging network corresponding to the paging network number comprises a receiver for receiving the third signal, a paging computer for generating a page signal including the identification number of the paging device in response to the third signal, and a transmitter for transmitting the page signal to the paging device. The mobile communication device further includes a controller for generating a fourth signal including a conference bridge callback number in response to the page signal and a transmitter for transmitting the fourth signal, The second mobile switching center includes a receiver for receiving the fourth signal and a transmitter for retransmitting the fourth signal to the conference bridge. The conference bridge further comprises an in-dial port for receiving the retransmitted fourth signal and means for connecting the caller to the mobile telephone in response to the fourth signal.

Additional desires and objects of the invention will be set forth in the description which follows, and in part will be apparent from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

DESCRIPTION OF THE PREFERRED EMBODIMENT

Figure 1:
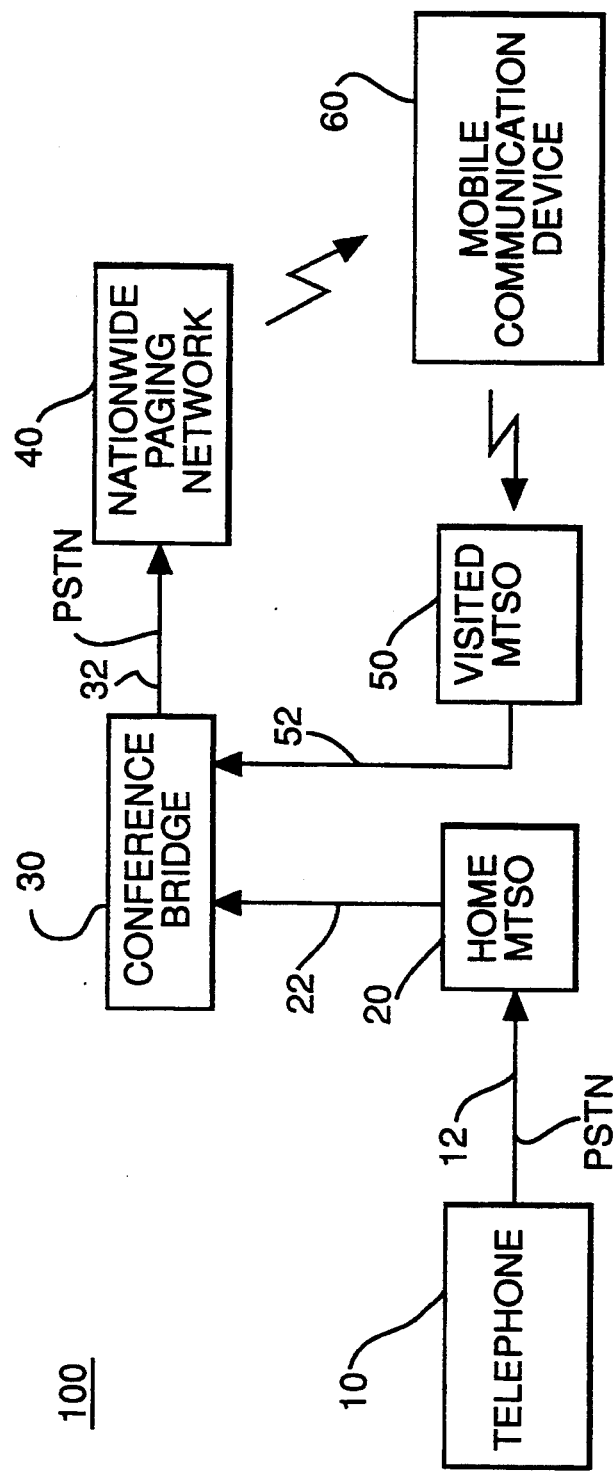
FIG. 1 is a block diagram of a system for establishing a communication link between a caller and a mobile communication device in accordance with one embodiment of the present invention.

FIG. 1 shows a block diagram of a system for establishing a communication link between a caller and a mobile communication device in accordance with an embodiment of the present invention. The system 100 preferably includes a home mobile telephone switching office (MTSO) 20, a conference bridge 30, a nationwide paging network 40, a visited MTSO 50, and a mobile communication device 60 associated with a roaming subscriber (not shown).

Calls are preferably initiated into the system via a telephone 10 coupled to the home MTSO 20 via the public switched telephone network (PSTN) 12. In this system, a caller attempting to call the mobile subscriber, preferably dials the mobile subscriber's cellular telephone number or mobile identification number (MIN), which is forwarded to the home MTSO 20 by the PSTN 12.

Figure 2:
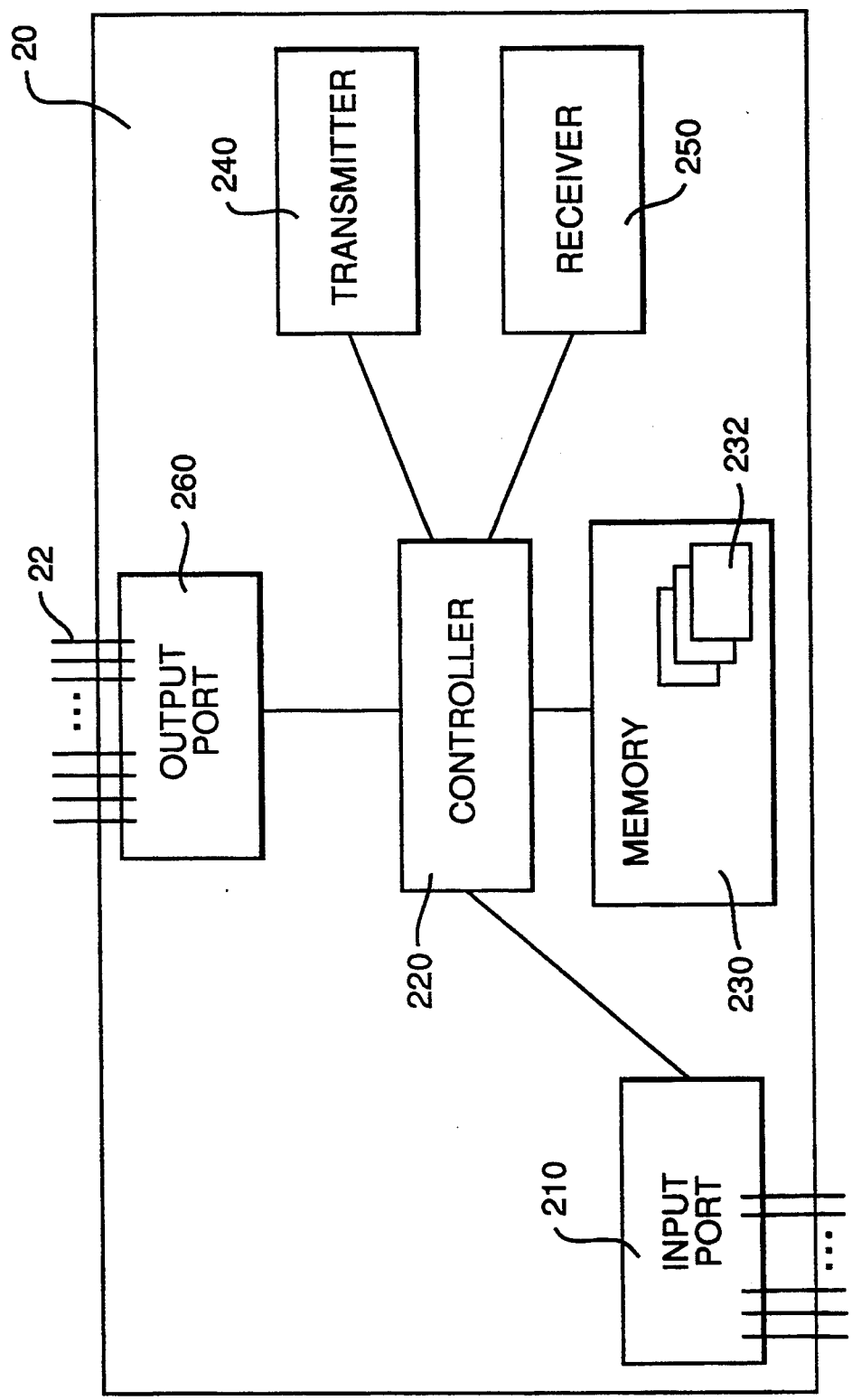
FIG. 2 is a block diagram of a mobile telephone switching office in accordance with one embodiment of the present invention.

The home MTSO 20, sometimes referred to as a home mobile switching center, as shown in FIG. 2, preferably includes an input port 210, a controller 220, a memory 230 which includes records 232 of, for example, services available to the subscriber and the subscriber's creditworthiness, a transmitter 240, a receiver 250, and an output port 260. The input port 210 receives calls forwarded by the PSTN 12. Controller 220 responds to the calls by accessing the records 232 in memory 230 to determine, for example, the services available to the subscriber and the subscriber's creditworthiness. If controller 220 deems the subscriber to be creditworthy, controller 220 transmits a cellular page from the transmitter 240 over the geographic region covered by the home MTSO 20. A cellular page includes the subscribers MIN and is transmitted using digital cellular control channels to determine if a subscriber's mobile communication device 60 is available to receive a telephone call. This cellular page is typically transmitted as part of a handshaking operation to establish a communication link between a cellular carrier and a subscriber's cellular phone. After transmitting the cellular page, the controller 220 waits a predetermined amount of time for the mobile communication device 60 to respond. If the subscriber's mobile communication device 60 is located within the region covered by the home MTSO 20 and is operational, it automatically responds to the cellular page by transmitting a response or "hand-shake" signal to the home MTSO 20. If the mobile communication device 60 is not operational or is not located within the region covered by the home MTSO 20, no hand-shake signal is received by the home MTSO 20.

Receiver 250 receives the hand-shake signal and controller 220 assigns a traffic channel for the call. Under control of controller 220, transmitter 240 then transmits an alerting order to the mobile communication device 60 causing it to ring.

However, if the home MTSO 20 does not receive a hand-shake signal from the mobile communication device 60 after waiting the predetermined amount of time, controller 220 forwards the call received at input port 210 to output port 260. The output port 260 of the home MTSO 20 is preferably coupled to a conference bridge 30 and a plurality of voice grade communication lines 22.

Figure 3:
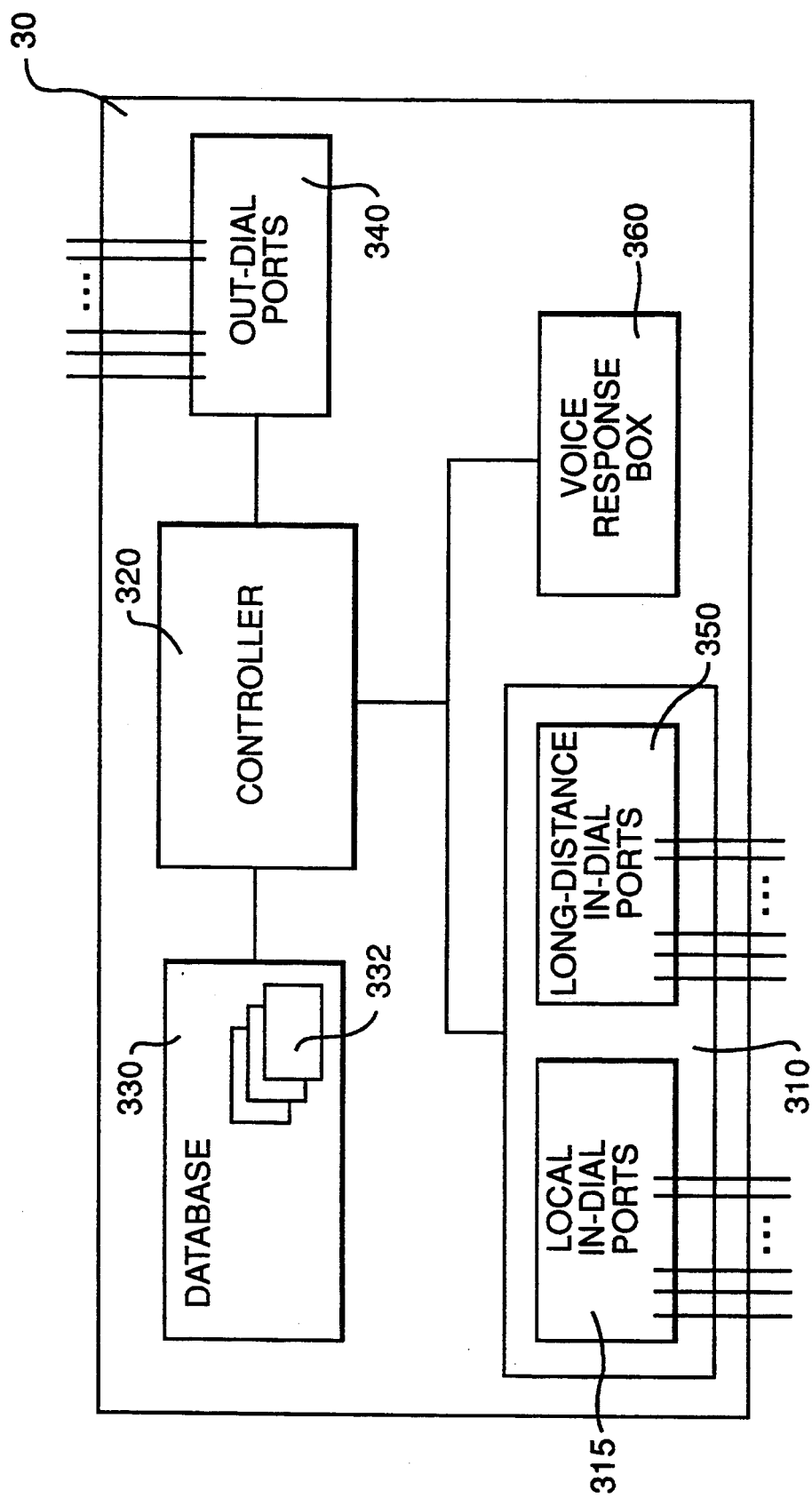
FIG. 3 is a block diagram of a conference bridge in accordance with one embodiment of the present invention.

As shown in FIG. 3, conference bridge 30 preferably includes in-dial ports 310, controller 320, database 330, out-dial ports 340, and voice response box 360. The in-dial ports 310 include local in-dial ports 315 and long distance in-dial ports 350.

A call forwarded by the home MTSO 20 is received by the conference bridge 30 at the in-dial ports 310. Upon receipt of a call from the home MTSO 20, controller 320 connects the caller to voice response box 360, which plays a recording advising the caller to "hold." The controller 320 then accesses the database 330 using the mobile subscriber's MIN, to retrieve data regarding services available to the mobile subscriber. The database 330 includes records 332, which include information regarding the paging network to which the subscriber is a member and services available to the subscriber, among other information. The retrieved information preferably includes the telephone number of a nationwide paging network 40 to which the mobile subscriber subscribes and a personal identification number ("PIN") for identifying the mobile subscriber to the nationwide paging network 40.

Figure 7A:
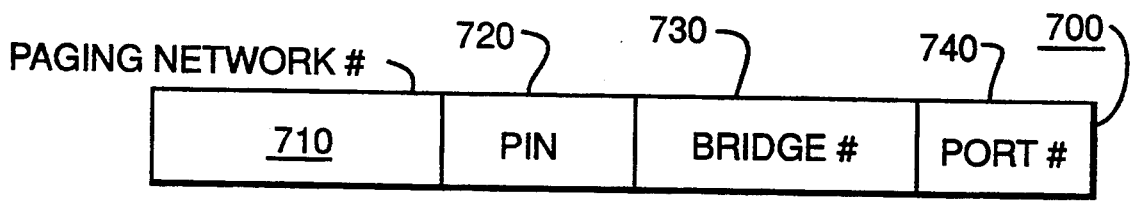
FIG. 7(a) illustrates a signal protocol for a signal sent from a conference bridge to a national paging network in accordance with one embodiment of the present invention.

Once this information is retrieved, controller 320 places a telephone call from out-dial ports 340 to the appropriate nationwide paging network 40 via PSTN 32. To place the telephone call, controller 320 generates a first signal 700, as shown in FIG. 7(a). First signal 700 preferably includes a telephone number 710 of the nationwide paging network 40, the subscriber's PIN 720, a telephone number 730 of the conference bridge 30, and the port number 740 of the in-dial port 310 to which the call has been assigned at the conference bridge 30. After transmitting this first signal 700 to the nationwide paging network 40, controller 320 waits a predetermined period of time for a callback from the mobile communication device 60.

Figure 4:
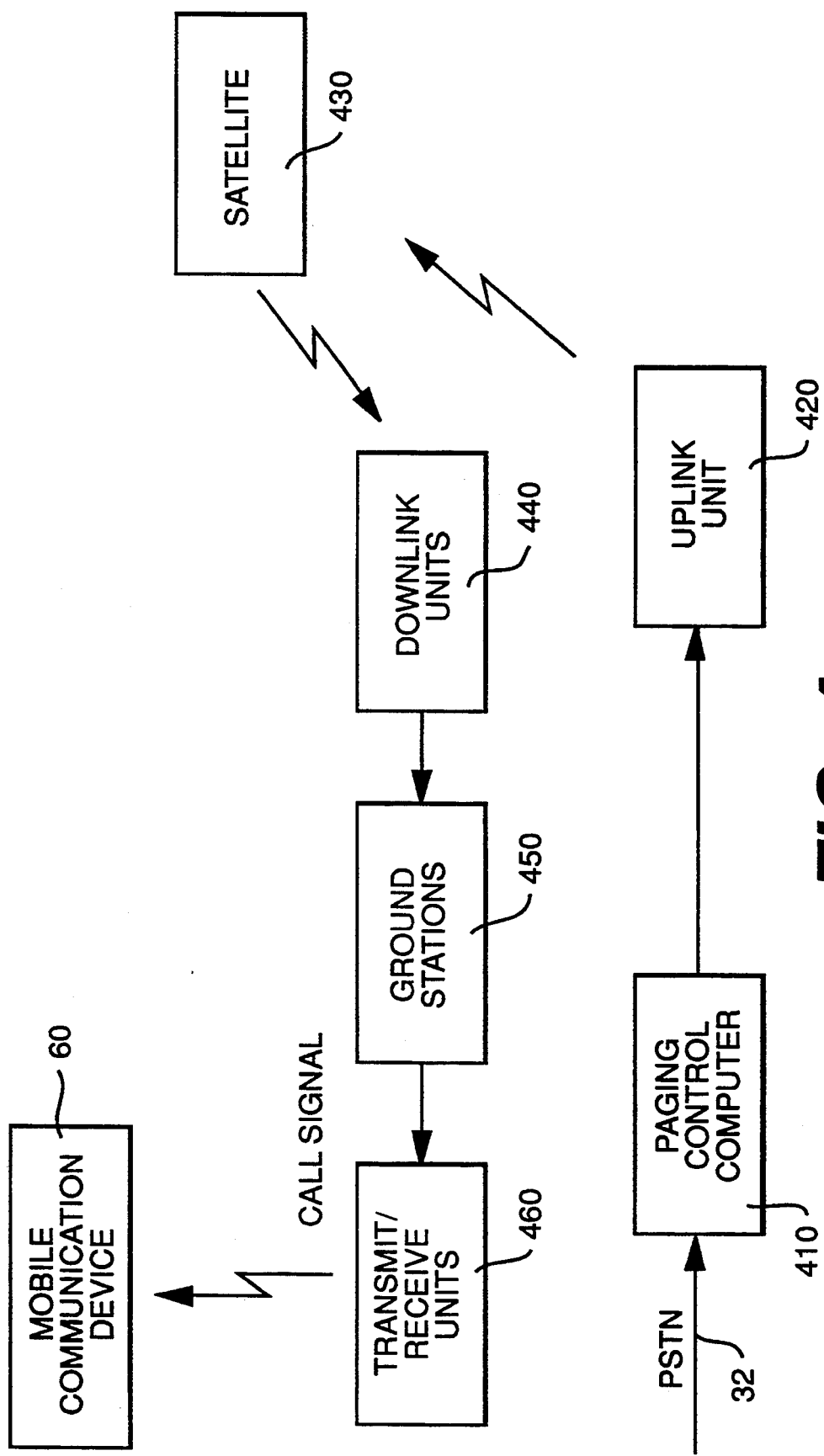
FIG. 4 is a block diagram of a nationwide paging network in accordance with one embodiment of the present invention.

FIG. 4 is a block diagram of a nationwide paging network 40 usable in accordance with an embodiment of the present invention. The nationwide paging network 40 preferably includes paging service computer 410, uplink unit 420, satellite 430, a plurality of downlink units 440, a plurality of ground stations 450, and a plurality of transmit/receive units 460.

Figure 9A:
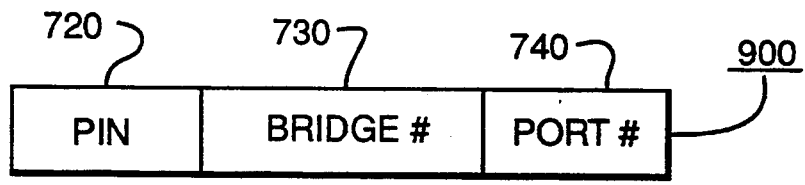
FIG. 9(a) illustrates a signal protocol for a signal transmitted by a national paging network to a mobile communication device in accordance with one embodiment of the present invention.

Paging control computer 410 is coupled to conference bridge 30 (not shown in FIG. 4) via the PSTN 32 and receives first signal 700 from conference bridge 30. In response to the first signal 700, paging control computer 410 generates a second data signal 900, which, as shown, for example, in FIG. 9(a), preferably includes the subscriber's PIN 720, the conference bridge telephone number 730, and the conference bridge in-dial port number 740 at which the caller is holding.

The paging control computer 410 transmits the second data signal 900 to the uplink unit 420. The uplink unit 420 uplinks the data signal 900 to satellite 430, which transmits the second data signal 900 to downlink units 440. The output of each downlink unit 440 is coupled to an input of a corresponding ground station 450 and sends the second data signal 900 thereto. An output signal of each ground station 450 is coupled to an input of a corresponding transmit/receive unit 460. Each transmit/receive unit 460 subsequently transmits a page signal throughout the geographic region covered by the transmit/receive unit 460 to be received by a mobile communication device 60.

Figure 5:
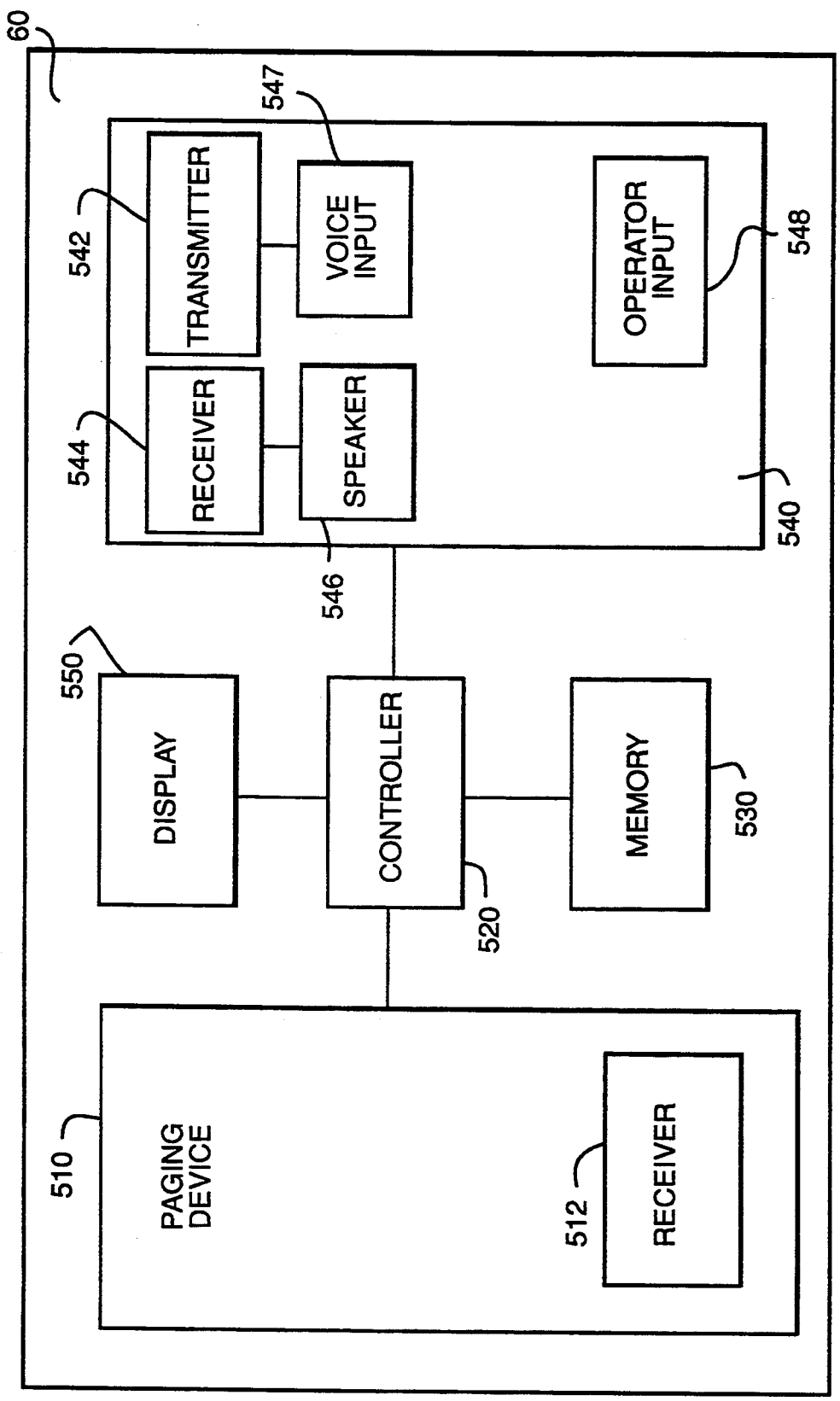
FIG. 5 is a block diagram of a mobile communication device in accordance with one embodiment of the present invention.
Figure 6A:
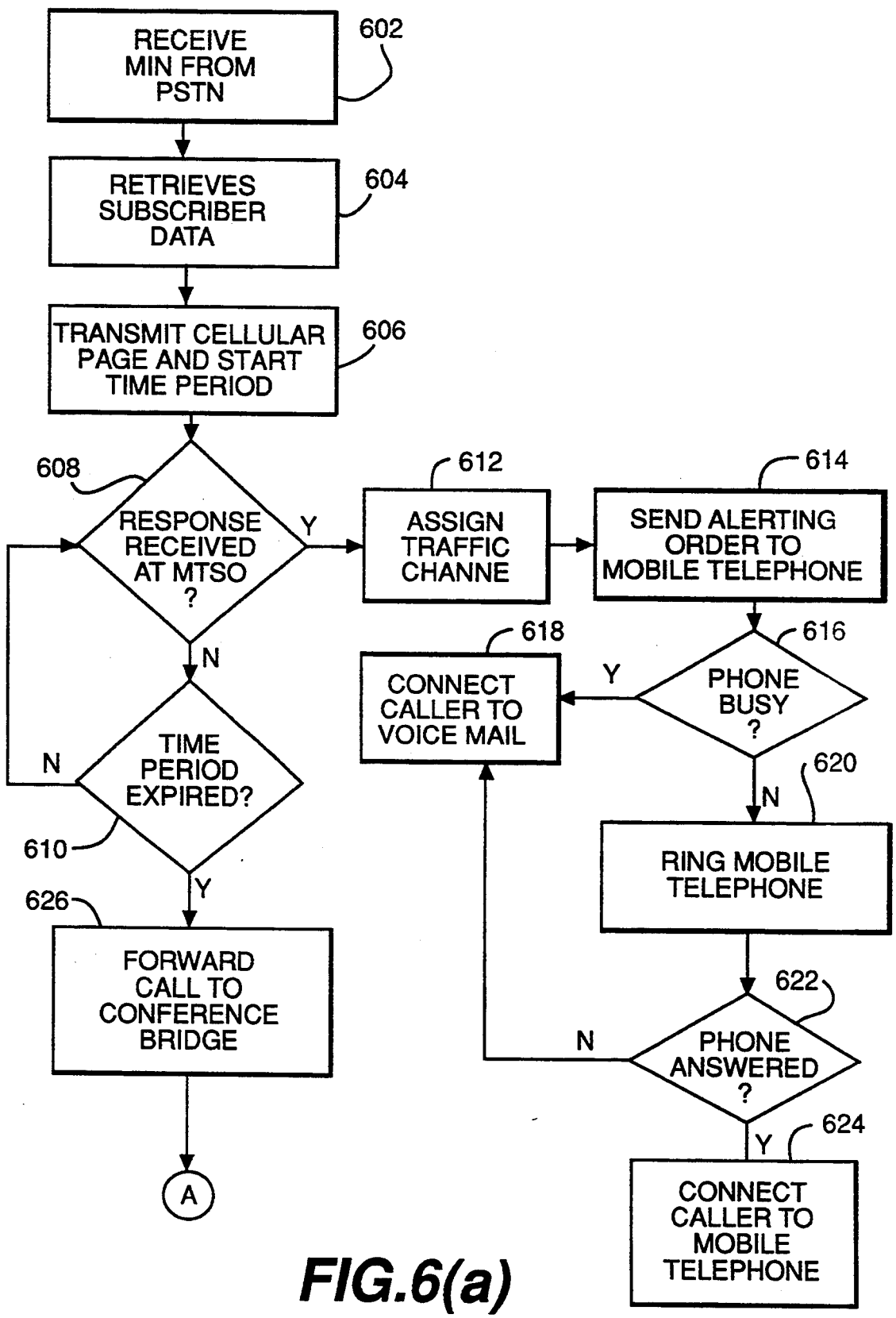
FIG. 6(a) is a flow diagram illustrating the operation of a mobile telephone switching office of a mobile communication system in accordance with one embodiment of the invention.
Figure 6B:
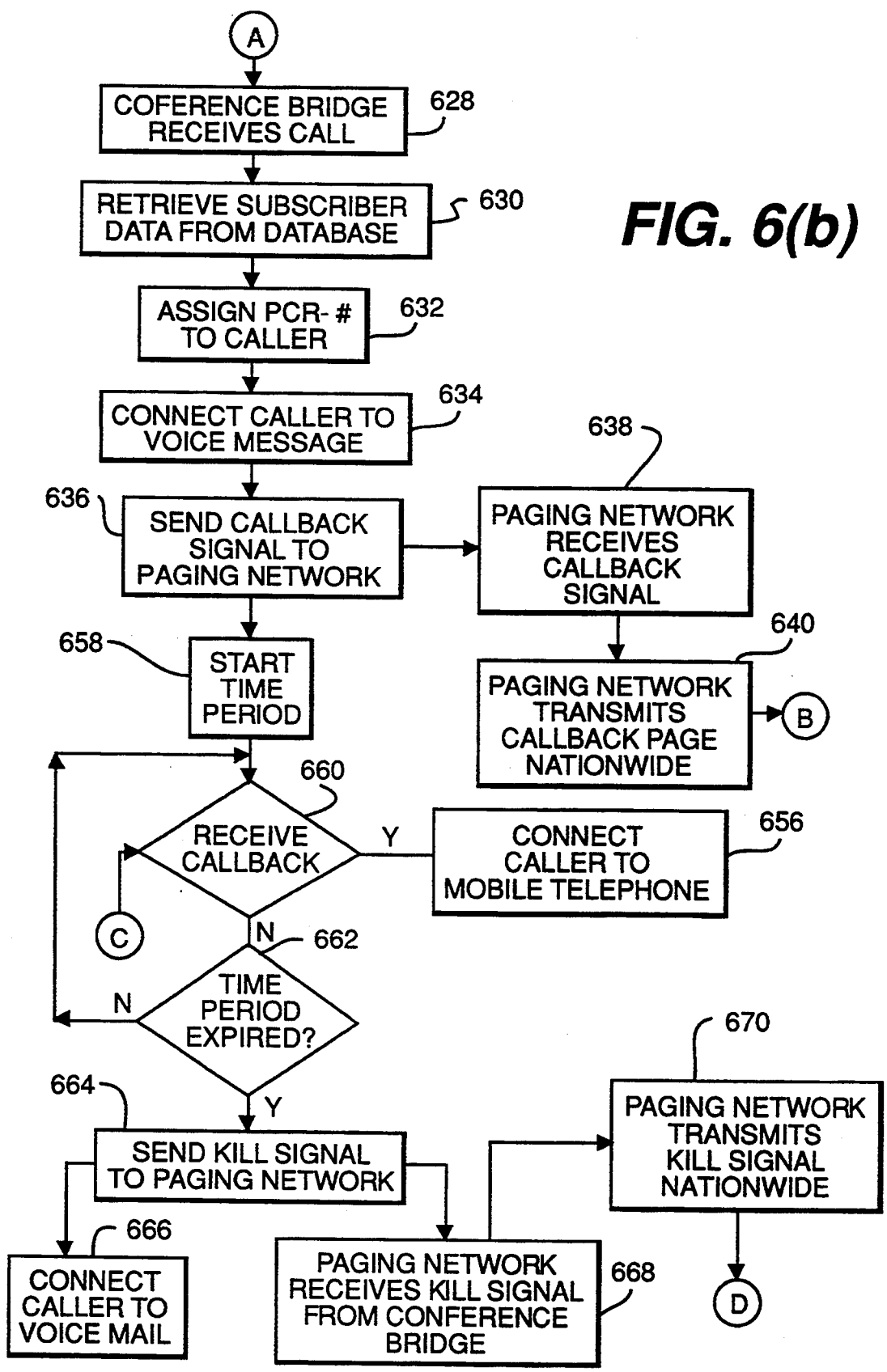
FIG. 6(b) is a flow diagram illustrating the operation of a conference bridge of a mobile communication system in accordance with one embodiment of the invention.
Figure 6C:
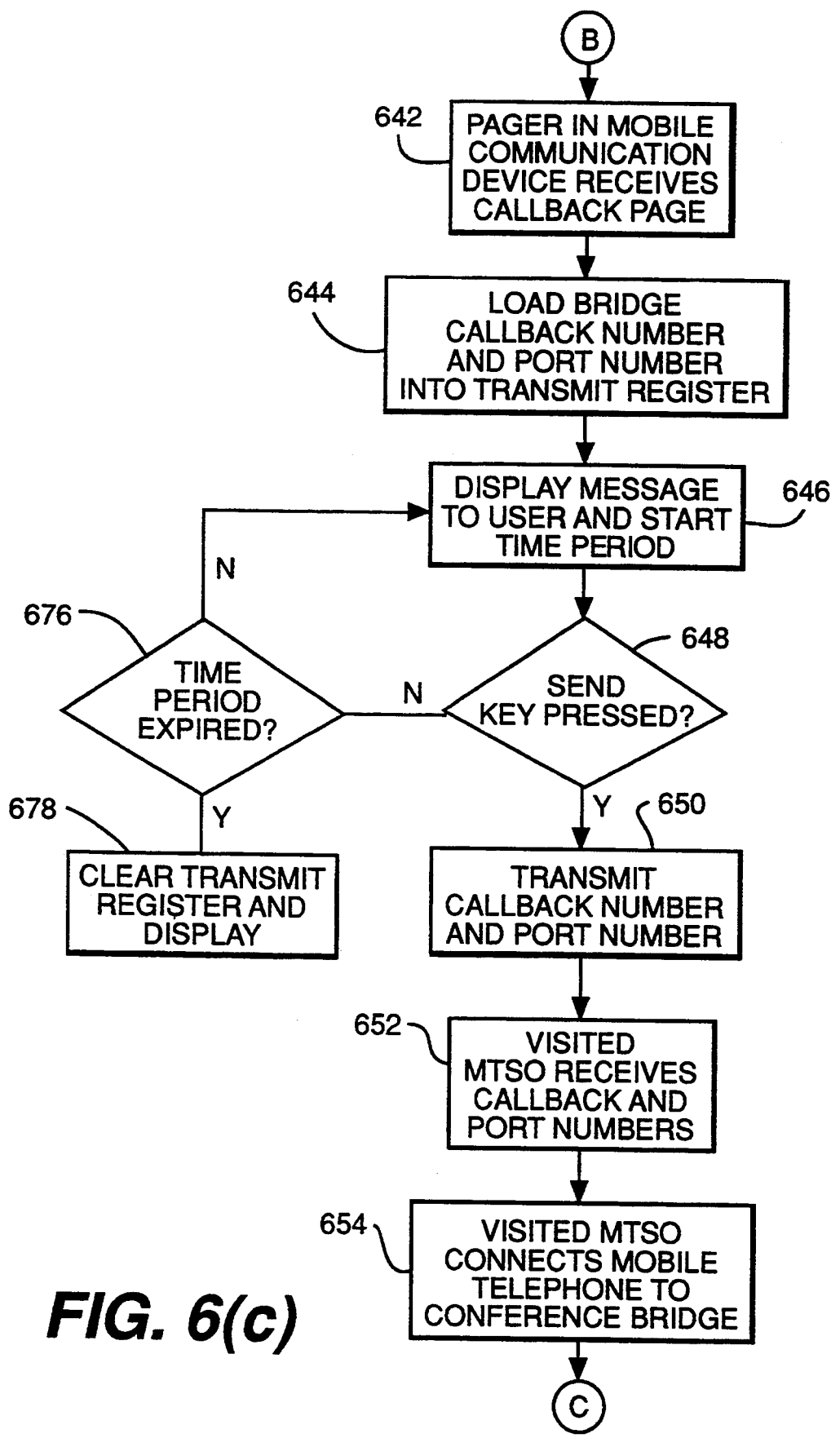
FIG. 6(c) is a flow diagram illustrating the operation of a mobile communication device of a mobile communication system in accordance with one embodiment of the invention.
Figure 6D:
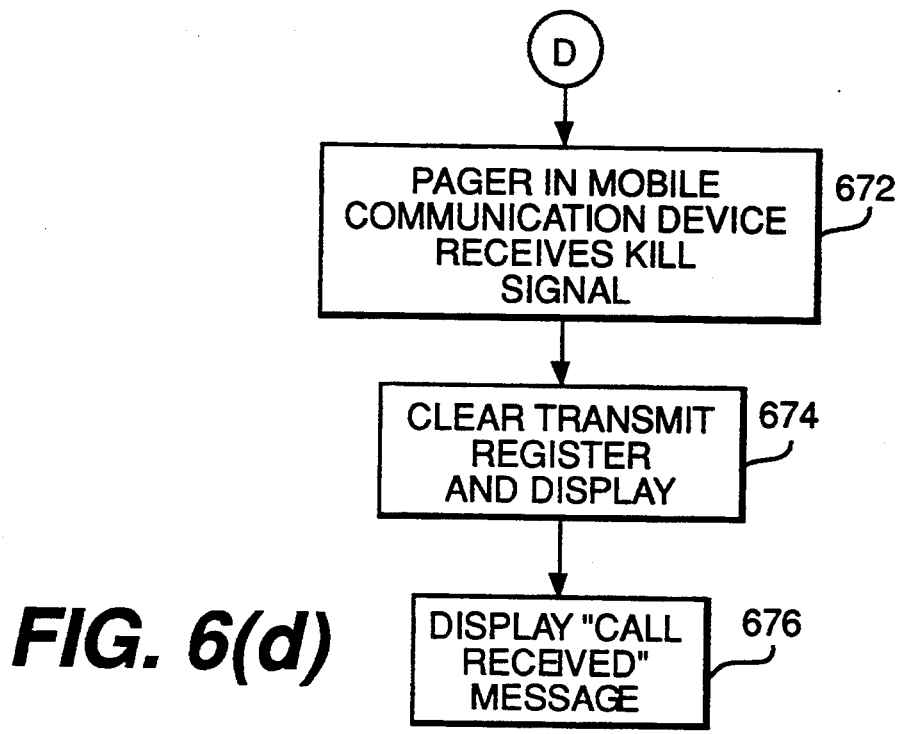
FIG. 6(d) is a flow diagram illustrating the operation of a mobile communication device of a mobile communication system in accordance with one embodiment of the invention.

A block diagram of a mobile communication device 60 utilized in a preferred embodiment of the present invention is shown in FIG. 5. The mobile communication device 60 preferably includes a paging device 510, a controller 520, a memory 530, a display 550, and a mobile telephone 540. The mobile telephone 540 preferably includes transmitter 542, receiver 544, speaker 546, voice input 547, and operator input 548. In a preferred embodiment, the mobile communication device 60 comprises an integrated unit containing both the paging device 510 and the mobile telephone 540. One example of such a device is described, for example, in commonly assigned Re. U.S. Pat. No. 33,417. The mobile communication device described in that patent is preferably adapted, as described herein, to provide an automatic, transparent, seamless, mobile telephone system in accordance with the present invention.

Figure 10:
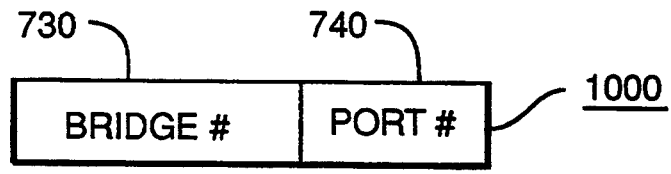
FIG. 10 illustrates a signal protocol for a signal transmitted by a mobile communication device to a visited mobile telephone switching office in accordance with one embodiment of the present invention.
Figure 11A:
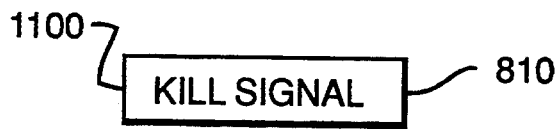
FIG. 11(a) illustrates a signal protocol for certain other signals transmitted by a nationwide paging network to a mobile communication device in accordance with one embodiment of the present invention.
Figure 11B:
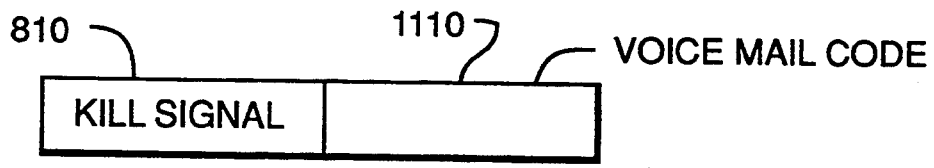
FIG. 11(b) illustrates a signal protocol for certain other signals transmitted by a nationwide paging network to a mobile communication device in accordance with another embodiment of the present invention.
Figure 11C:
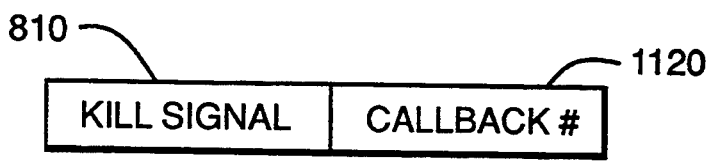
FIG. 11(c) illustrates a signal protocol for certain other signals transmitted by a nationwide paging network to a mobile communication device in accordance with another embodiment of the present invention.
Figure 11D:
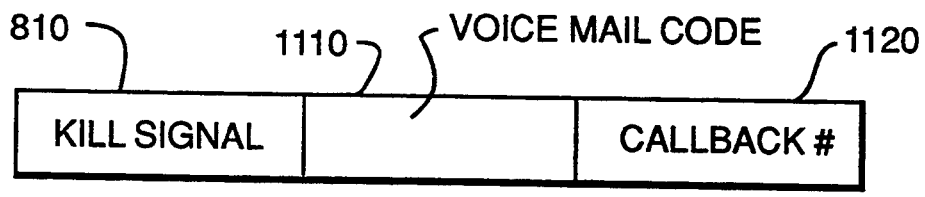
FIG. 11(d) illustrates a signal protocol for certain other signals transmitted by a nationwide paging network to a mobile communication device in accordance with another embodiment of the present invention.

The paging device 510 of the mobile communication device 60 includes a receiver 512 for receiving a page from a transmit/receiver unit 460 of the nationwide paging network 40. In a preferred embodiment of the present invention, the page transmitted by the nationwide paging network 40 includes the same information as the second data signal 900. When the receiver 512 receives the page, the controller 520 loads the conference bridge telephone number 730 and the port number 740 into a transmit register (not shown) in transmitter 542. The controller 520 then emits an audible noise from speaker 546 and displays a message or code on display 550 indicating that the subscriber has a call waiting at the conference bridge 30 and advising the subscriber to press a key on the operator input 548 to receive the call. If the mobile subscriber presses a predetermined key on the mobile communication device 60, such as the "send" key, the mobile communication device 60 transmits a third data signal 1000, shown in FIG. 10, to a visited MTSO 50. This third data signal includes the conference bridge callback number 730 and the port number 740.

The visited MTSO 50 includes the same structure as home MTSO 20, as shown in FIG. 2, and is connected to the conference bridge 30 via the PSTN 32. The visited MTSO 50 receives signals from mobile communication device 60 at its receiver 250. When a third data signal 1000 is received by the receiver 250, the controller 220 of the visited MTSO 50 outputs the third data signal 1000 from its output port 260 to the conference bridge 30 via the PSTN 32.

If the conference bridge 30 receives a callback from the subscriber's mobile communication device 60, or a signal including the in-dial port number 740 assigned to the forwarded call, at in-dial ports 310 within the predetermined period of time, controller 320 of the conference bridge 30 connects the callback from the mobile communication device 60 to the caller using the port number 740 included in the callback signal.

Figure 8:
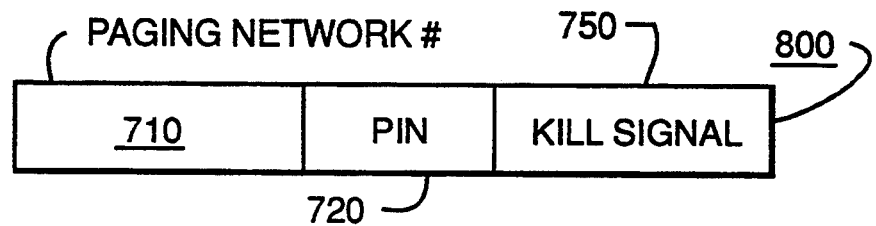
FIG. 8 illustrates signal protocols for certain other signals sent from a conference bridge to a national paging network in accordance with one embodiment of the present invention.

If the conference bridge 320 does not receive a callback from the subscriber's mobile communication device 60 within the predetermined amount of time, the conference bridge 30 places a second call from the outdial ports 340 to the nationwide paging network 40 via the PSTN. To place this second call, the controller 320 generates a fourth data signal 800, shown in FIG. 8, which includes the telephone number 710 of the nationwide paging network 40, the mobile subscriber's PIN 710, and a kill signal 810, which advises the subscriber's mobile communication device 60 that the callback is no longer necessary. Additionally, the conference bridge may connect the caller to the paging control computer via the PSTN 32 to enable the caller to leave a voice mail message or a callback number, if the subscriber is entitled to such services.

In response to the fourth data signal 800, the paging control computer 410 may output a variety of signals, as shown in FIGS. 11(a) through 11(d), which include the kill signal 810 received from the conference bridge 320, and may additionally include a voice mail code 1110, a callback number 1120 for the caller, or both a voice mail code 1110 and a callback number 1120.

If the receiver 512 of the paging device 510 receives a fourth data signal 1100, the controller 520 clears the transmit register in transmitter 542 and clears the display 550. The controller 520 then displays a message or code on the display 550 indicating a voice mail code 1110, a callback number 1120 for the caller, or both, if the fourth data signal 1100 includes such information.

If the mobile subscriber does not press the "send" key within a predetermined amount of time, longer than the amount of time that the conference bridge 30 awaits a callback, and no kill signal 1100 is received by the mobile communication device 60, the controller 520 automatically clears the transmit register, thus disabling the callback function. This action of the controller 520 is referred to as a "passive kill."

The structure described above is merely one embodiment of the present invention. The present invention contemplates alternative embodiments, including, for example, systems having the conference bridge functionality performed within the home MTSO 20 or within the PSTN 12. Further, the invention maybe be implemented in systems employing many different signaling systems, including, for example, X.25 or Signaling System 7 (SS7). Additionally, the home MTSO 20 or conference bridge 30 may provide voice mail or callback number services rather than the paging control computer.

FIGS. 6(a) through 6(d) are flow diagrams illustrating a method of operation of the system of FIG. 1 in accordance with an embodiment of the present invention. When a caller using telephone 10 dials the mobile subscriber's mobile identification number, or MIN, a signal including the mobile subscriber's MIN is transmitted on the PSTN to the subscriber's home MTSO 20 (step 602). Upon receipt of the signal, the home MTSO 20 retrieves data records 232 regarding the services available to the subscriber from the home MTSO memory 230 (step 604). The home MTSO 20 then transmits a cellular page including the mobile subscriber's MIN from transmitter 240 over the local geographic area surrounding the home MTSO 20 and starts a predetermined period of time (step 606). The home MTSO 20 then awaits a response from the mobile communication device 60 and monitors the time period (steps 608 and 610). If the subscriber's mobile communication device 60 is located in the area over which the cellular page is transmitted and is operational, the receiver 544 in the mobile communication device 60 receives the cellular page, and the mobile communication device 60 answers the cellular page by transmitting a hand-shake signal from transmitter 542.

If the receiver 250 in the home MTSO 20 receives a hand-shake signal from the mobile telephone 540 in the subscriber's mobile communication device 60 (step 608), the controller 220 in the home MTSO 20 assigns a traffic channel for the call (step 612) and transmits from the transmitter 240 an alerting order to the mobile telephone 540 (step 614). The home MTSO 20 then determines if the mobile telephone 540 is busy or idle (step 616). If the mobile telephone 540 is "busy", the home MTSO 20 connects the caller to the subscriber's voice mail (step 618). If the mobile telephone 540 in the subscriber's mobile communication device 60 is idle, the controller 520 in the mobile communication device 60 causes the mobile telephone 540 to ring in response to the alerting order (step 620). The home MTSO 20 then monitors for the mobile telephone 540 to be answered (step 622). If the mobile subscriber answers the mobile telephone 540, the home MTSO 20 connects the caller to the mobile telephone 540 (step 624). If the subscriber does not answer, the home MTSO 20 connects the call to the mobile subscriber's voice mail (step 618).

If the subscriber's mobile communication device 60 does not answer the cellular page within the predetermined time period, the home MTSO 20 forwards the call to the conference bridge 30 (step 626).

Once the conference bridge 30 receives the forwarded call (step 628), the conference bridge 30 retrieves subscriber data records 322 from a database 330, including data indicating what services are available to the subscriber, a telephone number of a paging network with which the subscriber is associated, and a personal identification number (PIN) for the subscriber (step 630). The conference bridge 30 then determines an in-dial port number at which the forwarded call will be held (step 632) and connects the caller to a voice message 360 advising the caller to "hold" (step 634). The conference bridge 30 then sends a callback signal to the paging network 40 (step 636) and starts running a predetermined period of time (step 658).

The paging network 40 receives the callback signal (step 638) and transmits a callback page nationwide (step 640). The paging device 510 in the mobile communication device 60 receives the callback page (step 642), and the mobile communication device 60 loads the bridge callback number and port number in the transmit register in the mobile telephone 540 (step 644). The mobile communication device 60 then displays a message to the operator of the mobile communication device 60 and emits an audible sound from speaker 546 indicating that a page has been received and that a caller is holding (step 646).

At this time, the mobile communication device 60 waits for the user to press a "send" key 548 instructing the mobile telephone 540 that the operator would like to receive the call (step 648). If the send key is pressed, the mobile telephone 540 transmits the callback number and the port number (step 650). A visited MTSO 50 receives the callback (step 652) and forwards the callback to the conference bridge 30 (step 654). When the conference bridge 30 receives the forwarded callback (step 660), the conference bridge 30 connects the caller to the mobile telephone 540 (step 656).

If the user does not press the send key 548 within a predetermined amount of time (step 676), the mobile communication device 60 clears the transmit register and the display 550 to prohibit the callback function (step 678).

If the conference bridge 30 does not receive a callback from the mobile telephone 540 within the predetermined period of time started in step 658 (steps 660 and 662), the conference bridge 30 sends a kill signal to the paging network 40 (step 664) and connects the caller to a voice mail (step 666).

When the paging network 40 receives the kill signal (step 668), the paging network 40 transmits the kill signal nationwide (step 670). When the paging device 510 in the mobile communication device 60 receives the second page (step 672), the mobile communication device 60 clears the transmit register and the display 550 (step 674) and displays a new message indicating that a call was received but is no longer holding (step 676).

With the system described above, the mobile subscriber is provided with automatic transparent roaming capabilities. The roaming subscriber is not required to take any action prior to or during travel to receive telephone calls on the mobile communication device.

Figure 7B:
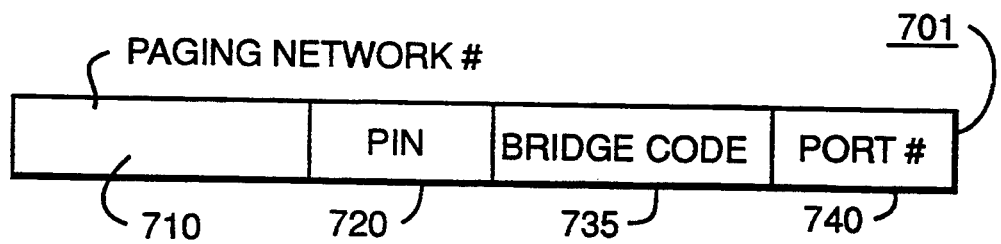
FIG. 7(b) illustrates a signal protocol for a signal sent from a conference bridge to a national paging network in accordance with another embodiment of the present invention.
Figure 9B:
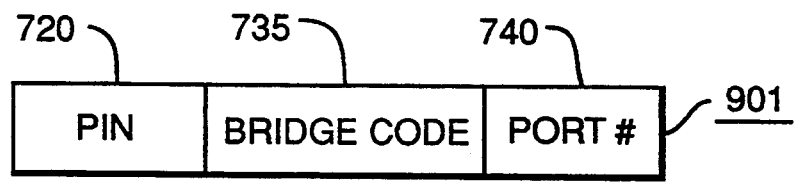
FIG. 9(b) illustrates a signal protocol for a signal transmitted by a national paging network to a mobile communication device in accordance with another embodiment of the present invention.

In an alternative embodiment of the invention, a telephone number of the conference bridge 730 is not included in the signal 700 generated by the controller 320 in the conference bridge 30 or in the page signal 900 transmitted by the paging network 40. Rather, as shown in FIGS. 7(b) and 9(b), a bridge code number 735 is included in the signals 701 and 901. In this alternative embodiment, conference bridge callback numbers and codes associated with the callback number are preferably preset in the memory 530 of the mobile communication device 60. When the paging device 510 receives a page signal including a bridge code number 735, the controller 520 retrieves a bridge callback number associated with the code number 735 and loads that bridge callback number into the transmit register.

In this alternative embodiment, the bridge code can be displayed on display 550, instead of the bridge callback number, to notify number 735 the subscriber that the conference bridge is being called. This embodiment has the added advantage of keeping the conference bridge callback number confidential and keeping the number of digits transmitted on the paging channel to a minimum.

In another embodiment of the invention, the paging device 510 in the mobile communication device 60 can be placed in an operative state while the mobile telephone 540 in the mobile communication device 60 is rendered inoperable. In this embodiment, the operator of the mobile communication device 60 is required to turn on the mobile telephone 540 after a page signal 900 is received. This embodiment is advantageous because the paging device 510 requires less power than the mobile telephone 540. Hence, the batteries in the mobile communication device 60 will retain adequate power significantly longer than if the mobile telephone 540 were to remain operable continuously.

The foregoing description of preferred embodiments of the invention has been presented for purposes of illustration and description. It is not intended to be exhaustive or limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and various modifications as are suited to the particular use contemplated. It is intended that the scope of the invention be defined by the claims appended hereto, and their equivalents.

What is claimed is:

1. A system for establishing a communication link between a caller and a mobile communication device including a mobile telephone and a paging device, comprising:

means for generating a first signal in response to a telephone call from said caller, said first signal including an identification number of said mobile telephone;

means for transmitting said first signal to a first mobile switching center, said first mobile switching center comprising:

means for receiving said first signal;

means responsive to said first signal for generating a second signal, said second signal including said identification number of said mobile telephone and a conference bridge number corresponding to said mobile telephone; and means for transmitting said second signal;

a conference bridge corresponding to said conference bridge number comprising:

means for receiving said second signal;

means responsive to said second signal for generating a third signal, said third signal including a paging network number and an identification number of said paging device; and means for transmitting said third signal;

a paging network corresponding to said paging network number comprising:

means for receiving said third signal;

means responsive to said third signal for generating a page signal including said identification number of said paging device; and means for transmitting said page signal to said mobile communication device;

said mobile communication device comprising:

means for receiving said page signal;

means responsive to said page signal for generating a fourth signal including a conference bridge callback number; and means for transmitting said fourth signal;

a second mobile switching center including means for receiving and retransmitting said fourth signal to said conference bridge;

said conference bridge further comprising:

means for receiving said retransmitted fourth signal; and means responsive to said fourth signal for connecting said caller to said mobile communication device.

2. A system according to claim 1 wherein said means for receiving said second signal in said conference bridge comprises an in-dial port.

3. A system according to claim 2, wherein said third signal and said page signal each further include a port number of said in-dial port.

4. A system according to claim 1, wherein said third signal and said page signal each further include a bridge callback number.

5. A system for establishing a communication link between a caller and a mobile communication device including a mobile telephone and a paging device, comprising:

means for generating a first signal in response to a telephone call from said caller, said first signal including an identification number of said mobile telephone;

means for transmitting said first signal to a first mobile switching center, said first mobile switching center comprising:

means for receiving said first signal;

means responsive to said first signal for generating a second signal, said second signal including said identification number of said mobile telephone and a conference bridge number corresponding to said mobile telephone; and means for transmitting said second signal;

a conference bridge corresponding to said conference bridge number comprising:

means for receiving said second signal;

means responsive to said second signal for generating a third signal, said third signal including a paging network number and an identification number of said paging device; and means for transmitting said third signal;

a paging network corresponding to said paging network number comprising:

means for receiving said third signal;

means responsive to said third signal for generating a page signal including said identification number of said paging device; and means for transmitting said page signal to said mobile communication device;

said mobile communication device comprising:

means for receiving said page signal;

means responsive to said page signal for generating a fourth signal including a conference bridge callback number; and means for transmitting said fourth signal;

a second mobile switching center including means for receiving and retransmitting said fourth signal to said conference bridge;

said conference bridge further comprising:

means for receiving said retransmitted fourth signal; and means responsive to said fourth signal for connecting said caller to said mobile communication device;

said conference bridge further comprising:

means for generating a fifth signal if said fourth signal is not received within a predetermined amount of time after said third signal is transmitted, said fifth signal including said paging network number, said identification number of said mobile communication device, and a kill signal; and means for transmitting said fifth signal;

said paging network further comprising:

means for receiving said fifth signal;

means for generating a second page signal including said kill signal and said identification number of said mobile communication device; and means for transmitting said second page signal; and said mobile communication device further comprising:

means for receiving said second page signal; and means for prohibiting transmission of said fourth signal in response to said second page signal.

6. A system according to claim 1, said conference bridge being included in said mobile switching center.

7. A system according to claim 1, said conference bridge being included in said means for transmitting said first signal to a first mobile switching center.

8. A system according to claim 1, wherein the caller can call the subscriber using the same identification number of the mobile telephone regardless of whether the subscriber is at a home region covered by the first mobile switching center or at a remote region covered by the second mobile switching center.

9. A communication system comprising:

means for generating a communication signal;

means for receiving the communication signal and generating a first signal in response to the communication signal;

a first mobile switching center coupled to the receiving means;

a conference bridge coupled to the first mobile switching center;

a paging network coupled to the conference bridge;

means for transmitting said first signal to the first mobile switching center, said first mobile switching center comprising:
- at least one first input port and at least one first output port;
- means for receiving said first signal at the one first input port;
- means responsive to said first signal for generating a second signal, said second signal including a conference bridge number corresponding to the conference bridge; and
- means for transmitting said second signal through the one first output port;

said conference bridge comprising:
- at least one second input port and at least one second output port;
- means for receiving said second signal at the one second input port;
- means responsive to said second signal for generating a third signal, said third signal including a paging network number corresponding to the paging network; and
- means for transmitting said third signal through the one second output port;

said paging network comprising:
- means for receiving said third signal;
- means responsive to said third signal for generating a page signal; and
- means for transmitting said page signal;

a second mobile switching center, coupled to the paging network, comprising:
- at least one third input port and at least one third output port;
- means, responsive to the page signal, for receiving a fourth signal including a conference bridge callback number at the one third input port; and
- means for retransmitting said fourth signal to said conference bridge through the one third output port;

said conference bridge further comprising:
- means for receiving said retransmitted fourth signal; and
- means responsive to said fourth signal for connecting the one first input port of the first mobile switching center to the one third output port of the second mobile switching center.

* * * * *

UNITED STATES PATENT AND TRADEMARK OFFICE
CERTIFICATE OF CORRECTION

PATENT NO. : 5,414,750
DATED : May 9, 1995
INVENTOR(S) : Jai Bhagat, et. al.

It is certified that error appears in the above-indentified patent and that said Letters Patent is hereby corrected as shown below:

Title page, item [54] and col. 1, line 3, after "NETWORK", insert --FOR ESTABLISHING COMMUNICATION LINK--.

Column 13, claim 4, delete boldface type after "4." and replace with regular type.

Signed and Sealed this

Twenty-second Day of August, 1995

Attest:

BRUCE LEHMAN

*Attesting Officer*  *Commissioner of Patents and Trademarks*